US012631662B2

(12) United States Patent
Bloemer et al.

(10) Patent No.: US 12,631,662 B2
(45) Date of Patent: May 19, 2026

(54) VIBRATION MONITORS WITH INDICATOR LIGHTS

(71) Applicant: EPRO GMBH, Gronau (DE)

(72) Inventors: Stephan Bloemer, Gronau (DE);
Thomas Wewers, Stadtlohn (DE)

(73) Assignee: EPRO, Gronau (DE)

( * ) Notice: Subject to any disclaimer, the term of this patent is extended or adjusted under 35 U.S.C. 154(b) by 337 days.

(21) Appl. No.: 18/477,172

(22) Filed: Sep. 28, 2023

(65) Prior Publication Data

US 2025/0110147 A1    Apr. 3, 2025

(51) Int. Cl.
| | |
|---|---|
| *G01F 1/08* | (2006.01) |
| *G01H 1/00* | (2006.01) |
| *G01H 1/12* | (2006.01) |
| *G01P 1/08* | (2006.01) |
| *G02B 1/04* | (2006.01) |
| *G02B 6/42* | (2006.01) |

(52) U.S. Cl.
CPC .............. *G01P 1/08* (2013.01); *G01H 1/003* (2013.01); *G01H 1/12* (2013.01); *G02B 1/046* (2013.01); *G02B 6/4248* (2013.01); *G02B 6/426* (2013.01); *G02B 6/4298* (2013.01)

(58) Field of Classification Search
CPC .......... G01H 1/003; G01H 1/12; G01H 11/06; G01P 1/08; G02B 1/046; G02B 6/4248; G02B 6/426; G02B 6/4298; H04Q 9/00
See application file for complete search history.

(56) References Cited

U.S. PATENT DOCUMENTS

| | | | |
|---|---|---|---|
| 11,828,449 B2 * | 11/2023 | Mo | ......................... E03D 5/105 |
| 2015/0179030 A1 | 6/2015 | Mottershead et al. | |
| 2019/0065924 A1 * | 2/2019 | Nooner | ............ G06K 19/07758 |
| 2021/0250090 A1 * | 8/2021 | Clarridge | ................ H04W 4/38 |
| 2022/0018531 A1 * | 1/2022 | Mo | ......................... F21S 10/066 |

FOREIGN PATENT DOCUMENTS

CN        107515040 A    12/2017

OTHER PUBLICATIONS

International Searching Authority, "Written Opinion," issued in connection with International Patent Application No. PCT/EP2024/077170, mailed on Nov. 28, 2024, 4 pages.
International Searching Authority, "International Search Report," issued in connection with International Patent Application No. PCT/EP2024/077170, mailed on Nov. 28, 2024, 3 pages.

* cited by examiner

*Primary Examiner* — Alexander A Mercado
(74) *Attorney, Agent, or Firm* — Hanley, Flight & Zimmerman, LLC

(57)        ABSTRACT

Vibration monitors having indicator lights are described herein. An example vibration monitor includes a housing, a sensor in the housing, a light source extending circumferentially around an outer surface of the housing, and circuitry to activate the light source based on a status of the vibration monitor.

20 Claims, 9 Drawing Sheets

VIBRATION MONITORS WITH INDICATOR LIGHTS

FIELD OF THE DISCLOSURE

This disclosure relates generally to vibration monitors and, more particularly, to vibration monitors with indicator lights.

BACKGROUND

Vibration monitors are often used on equipment with rotating parts, such as motors and pumps. A vibration monitor detects vibrations from the equipment, which can be analyzed and used to determine or identify an operating condition (e.g., a worn bearing) of the equipment.

SUMMARY

An example vibration monitor disclosed herein includes a housing, a sensor in the housing, a light source extending circumferentially around an outer surface of the housing, and circuitry to activate the light source based on a status of the vibration monitor.

An example vibration monitor disclosed herein includes a housing, a sensor in the housing, and a light pipe on an outer surface of the housing. The light pipe has a protrusion extending through an opening in the housing. The vibration monitor also includes a light-emitting diode (LED) in the housing. The LED is adjacent the protrusion. The vibration monitor further includes circuitry to activate the LED to illuminate the light pipe.

Figure 1:
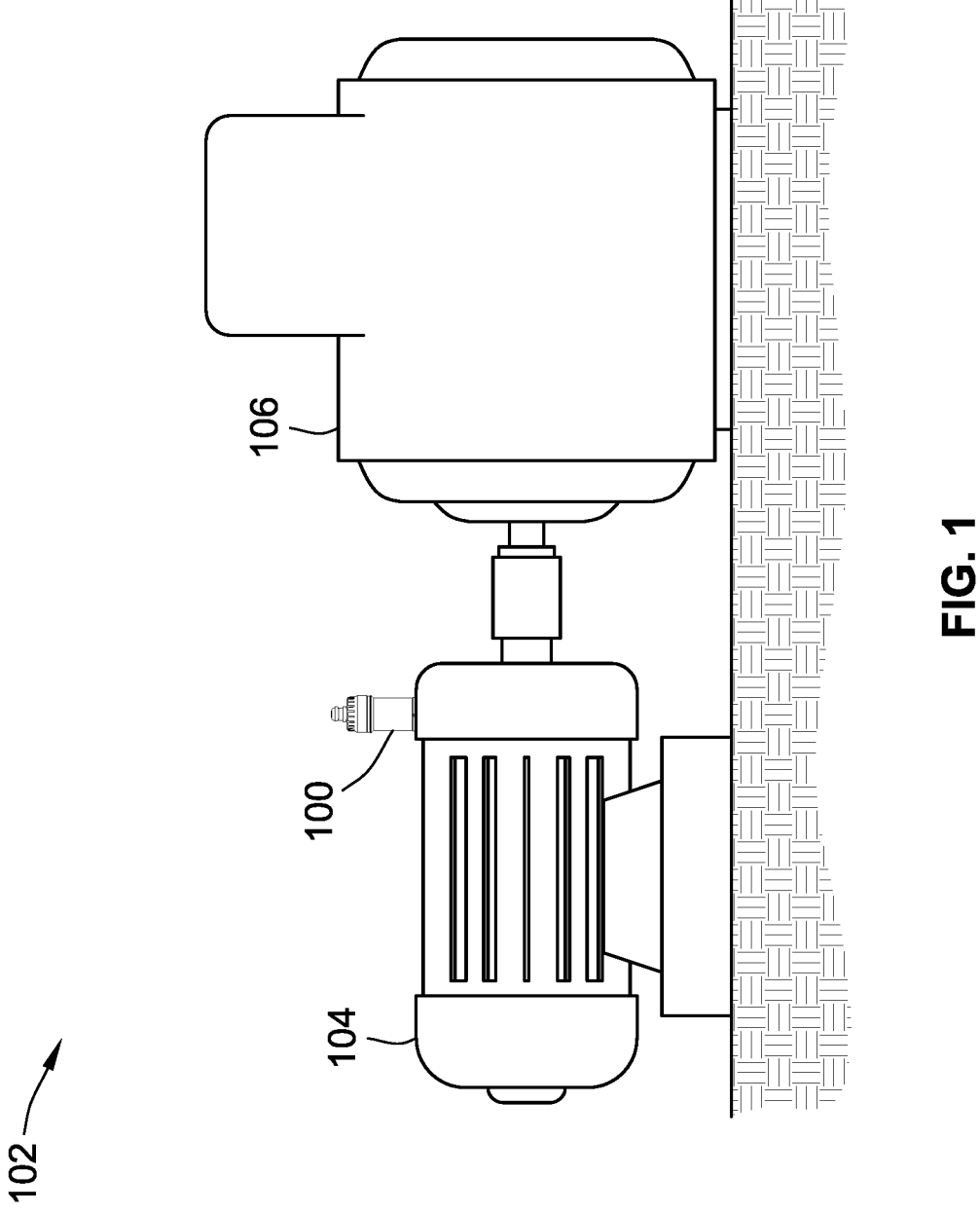
FIG. 1 shows an example vibration monitor in an example environment in which the example vibration monitor is used to monitor and/or detect vibration of an example motor.

In general, the same reference numbers will be used throughout the drawing(s) and accompanying written description to refer to the same or like parts. The figures are not necessarily to scale. Instead, the thickness of the layers or regions may be enlarged in the drawings. Although the figures show layers and regions with clean lines and boundaries, some or all of these lines and/or boundaries may be idealized. In reality, the boundaries and/or lines may be unobservable, blended, and/or irregular.

DETAILED DESCRIPTION

Disclosed herein are example vibration monitors with indicator lights. A vibration monitor is a device that includes one or more sensors that can measure or detect movement (e.g., vibration). Vibration monitors are commonly used on machines and other equipment with rotating components to determine an operating condition and/or monitor for a potential fault (e.g., a worn bearing) in the machine. For example, vibration monitors may be coupled to motors or pumps in a factory, a refinery, a plant, etc.

An example vibration monitor disclosed herein includes a housing, one or more sensors in the housing, and a light source disposed around an outer surface of the housing. As used herein, the term light source means the structure from which light is emitted and received by a person's eye. The light source may be the structure that creates the light, such as a filament, a light-emitting diode, etc., and/or may be an intermediate structure such as a light pipe or other structure from which the light is emitted. The light source can be activated to indicate various statuses or states of the vibration monitor, such as whether the vibration monitor is active, pairing with another device, detecting a fault, battery status, etc. In some examples, the light source extends circumferentially all the way around the housing. For example, the light source may be a disc-shaped or ring-shaped light. As such, the light source is visible from multiple directions or angles around the vibration monitor. This enables a person (e.g., a service technician) to easily see the status of the vibration monitor from different sides of the vibration motor. For example, if the vibration monitor is connected to a machine in a location where only one side of the vibration monitor is visible, the light source can still be visible so the person can easily determine the status of the vibration monitor. Therefore, the vibration monitor does not need to be oriented in a specific alignment or require additional software to determine the status.

As used in this patent, stating that any part (e.g., a layer, film, area, region, or plate) is in any way on (e.g., positioned on, located on, disposed on, or formed on, etc.) another part, indicates that the referenced part is either in contact with the other part, or that the referenced part is above the other part with one or more intermediate part(s) located therebetween.

As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly within the context of the discussion (e.g., within a claim) in which the elements might, for example, otherwise share a same name.

As used herein, the phrase "in communication," including variations thereof, encompasses direct communication and/ or indirect communication through one or more intermediary components, and does not require direct physical (e.g., wired) communication and/or constant communication, but rather additionally includes selective communication at periodic intervals, scheduled intervals, aperiodic intervals, and/or one-time events.

As used herein, "programmable circuitry" is defined to include (i) one or more special purpose electrical circuits (e.g., an application specific circuit (ASIC)) structured to perform specific operation(s) and including one or more semiconductor-based logic devices (e.g., electrical hardware implemented by one or more transistors), and/or (ii) one or more general purpose semiconductor-based electrical circuits programmable with instructions to perform specific functions(s) and/or operation(s) and including one or more semiconductor-based logic devices (e.g., electrical hardware implemented by one or more transistors). Examples of programmable circuitry include programmable microprocessors such as Central Processor Units (CPUs) that may execute first instructions to perform one or more operations and/or functions, Field Programmable Gate Arrays (FPGAs) that may be programmed with second instructions to cause configuration and/or structuring of the FPGAs to instantiate one or more operations and/or functions corresponding to the first instructions, Graphics Processor Units (GPUs) that may execute first instructions to perform one or more operations and/or functions, Digital Signal Processors (DSPs) that may execute first instructions to perform one or more operations and/or functions, XPUs, Network Processing Units (NPUs) one or more microcontrollers that may execute first instructions to perform one or more operations and/or functions and/or integrated circuits such as Application Specific Integrated Circuits (ASICs). For example, an XPU may be implemented by a heterogeneous computing system including multiple types of programmable circuitry (e.g., one or more FPGAs, one or more CPUs, one or more GPUs, one or more NPUs, one or more DSPs, etc., and/or any combination(s) thereof), and orchestration technology (e.g., application programming interface(s) (API(s)) that may assign computing task(s) to whichever one(s) of the multiple types of programmable circuitry is/are suited and available to perform the computing task(s).

As used herein integrated circuit/circuitry is defined as one or more semiconductor packages containing one or more circuit elements such as transistors, capacitors, inductors, resistors, current paths, diodes, etc. For example an integrated circuit may be implemented as one or more of an ASIC, an FPGA, a chip, a microchip, programmable circuitry, a semiconductor substrate coupling multiple circuit elements, a system on chip (SoC), etc.

FIG. 1 shows an example vibration monitor 100 in an example environment 102 in which the vibration monitor 100 is used in connection with a machine. The vibration monitor 100 may also be referred to as a vibration sensor. The example environment 102 may be, for example, a factory, a plant, a refinery, and/or any other environment having one or more machines. In FIG. 1, the vibration monitor 100 is used in connection with a motor 104 that is driving a pump 106. However, the vibration monitor 100 can also be used in connection with any other type of machine. In the illustrated example, the vibration monitor 100 is coupled to the motor 104. For example, the vibration monitor 100 may be coupled to the motor 104 via a threaded connection (e.g., a threaded post, a bolt, etc.). In other examples, the vibration monitor 100 can be coupled to the motor 104 via other fastening techniques, such as an adhesive, magnets, friction fit, etc.

The vibration monitor 100 includes one or more sensors (shown in further detail herein), such as accelerometer(s) and/or gyroscope(s). The sensor(s) output signal(s) that are indicative of the motion (e.g., vibration) of the motor 104. The signals can be analyzed to detect if a problem is occurring with the motor 104 and/or the pump 106. For example, if the motor 104 has a faulty or worn bearing, the vibration of the motor 104 begins to change (e.g., increases in frequency, becomes irregular, etc.). This change in vibration is detected by the vibration monitor 100. The vibration monitor 100 can analyze the vibration signals to detect potential problems and/or communicate the signals and/or detected problems to a remote electric device, such as a control room. In some examples, the vibration monitor 100 is connected to the remote electronic device by a wire or cable. The wire or cable may also provide power to the vibration monitor 100. In other examples, the vibration monitor 100 can be a wireless device that can wirelessly communicate over a network with the remote electronic device and/or one or more other devices (e.g., other vibration monitors). In some such examples, the vibration monitor 100 has its own power supply, such as a battery.

Figure 2:
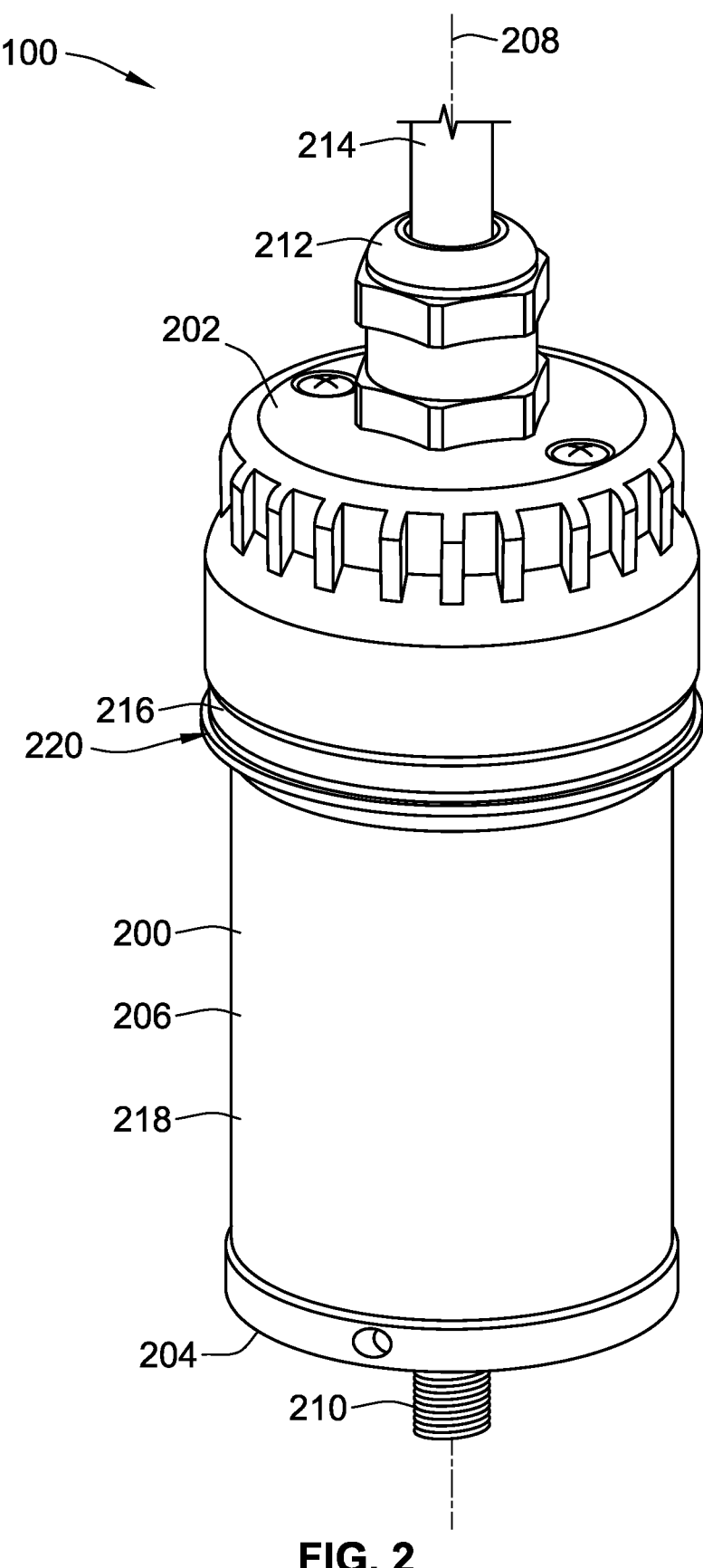
FIG. 2 is a perspective view of the example vibration monitor of FIG. 1.

FIG. 2 is a perspective view of the example vibration monitor 100. As shown in FIG. 2, the vibration monitor 100 includes a housing 200, which may also be referred to as a body or container. The housing 200 contains or houses one or more sensors and/or electrical components (e.g., programmable circuitry), disclosed in further detail herein. The housing 200 protects the internal sensor(s) and/or electrical components from outside debris (e.g., rain, dust, etc.). In some examples, the housing 200 is constructed of metal (e.g., aluminum, stainless steel, etc.), plastic (e.g., PA6.6, PA 6.6 30GF, PC), etc.

In the illustrated example, the housing 200 is cylindrical. The housing 200 has a first end 202, referred to herein as a top end 202, a second end 204, referred to herein as a bottom end 204, opposite the first end 202, and a side wall 206 between the top end 202 and the bottom end 204. The housing 200 has a central axis 208. In some examples, the housing 200 is constructed of multiple housing portions that are coupled together, an example of which is disclosed in further detail herein. In the illustrated example, the vibration monitor 100 has a threaded post 210 extending from the bottom end 204. The vibration monitor 100 can be coupled to the motor 104 (FIG. 1) by screwing the threaded post 210 into a threaded bore on the motor 104.

In the illustrated example, the vibration monitor 100 includes a cable gland or connector 212 on the top end 202. The cable gland 212 is shown as connecting a cable 214 to the vibration monitor 100. The cable 214 can provide communication with a remote electronic device and/or provide power to the vibration monitor 100. Additionally or alternatively, in other examples, the vibration monitor 100 can include a transceiver to wirelessly communicate with a remote electronic device.

In the illustrated example, the vibration monitor 100 includes a light source 216 that is carried by or coupled to the housing 200. The light source 216 may also be referred to herein as an indicator light. The light source 216 can illuminate different colors and/or blink/flash different patterns based on a status of the vibration monitor 100. For example, different colors and/or different blink patterns can be used to indicate a communication status of the vibration monitor 100 (e.g., whether the vibration monitor 100 is successfully paired with another device), a hardware error (e.g., a problem with the vibration monitor 100), a fault status or other condition in the equipment (e.g., the motor 104), a battery status of the vibration monitor 100, etc. In some examples, a user may know the various colors and/or blink patterns ahead of time. Additionally or alternatively, a user mobile device can be used to identify the colors and/or blink patterns and the associated statuses.

In the illustrated example, the light source 216 extends circumferentially around an outer surface 218 of the housing 200. In the illustrated example, the light source 216 is disc-shaped or ring-shaped. However, in other examples, the light source 216 may be shaped differently based on the cross-sectional shape of the housing 200. For example, the light source 216 may be shaped as an ellipse, a square, a triangle, etc. In some examples, the light source 216 is positioned coaxial with the housing 200. In some examples, the light source 216 forms a complete loop or circle around (e.g., encircles, surrounds, etc.) the outer surface 218 of the housing 200. This enables the light source 216 to be seen from all directions (e.g., 360°) around the vibration monitor 100. Therefore, when the vibration monitor 100 is coupled to a machine, a user can easily see the light source 216 (and, thus, determine the status) of the vibration monitor 100 from various directions and/or angles. However, in other examples, the light source 216 may include one or more portions that extend only partially circumferentially around the outer surface 218 (e.g., a partial ring where the ends of the light source 216 do not touch).

In the illustrated example, the light source 216 is disposed in a groove 220 (e.g., a gland, a recess) formed in the outer surface 218 of the side wall 206 of the housing 200. In this example, an outer surface of the light source 216 is recessed or set back from the outer surface 218 of the housing 200 above and below the light source 216. However, in other examples, the light source 216 may protrude outward from the outer surface 218 of the housing 200. In the illustrated example, the light source 216 is positioned closer to the top end 202 than the bottom end 204. However, in other examples, the light source 216 can be positioned along the middle of the housing 200 or closer to the bottom end 204 of the housing 200. While in the illustrated example the housing 200 is cylindrical, in other examples, the housing 200 may be shaped differential (e.g., cuboid shaped).

Figure 3:
FIG. 3 is a partially exploded view of the example vibration monitor of FIG. 2.

FIG. 3 is a partially exploded view of the example vibration monitor 100. In the illustrated example, the housing 200 includes a first housing portion 300 and a second housing portion 302 that is coupled to the first housing portion 300 when the vibration monitor 100 is assembled. The first housing portion 300 has a first end 304, which forms the top end 202 of the housing 200, and a second end 306 opposite the first end 304. The second housing portion 302 has a first end 308 and a second end 310 opposite the first end 308. When the vibration monitor 100 is assembled, the first end 308 of the second housing portion 302 is at least partially disposed in the first housing portion 300. In the illustrated example, the vibration monitor 100 includes a base plate 312. When the vibration monitor 100 is assembled, the base plate 312 is coupled (e.g., via one or more threaded fasteners) to the second end 310 of the second housing portion 302. The second end 310 of the second housing portion 302 and the base plate 312 forms the bottom end 204 of the housing 200. The threaded post 210 is coupled to and extends downward from the base plate 312.

Figure 4:
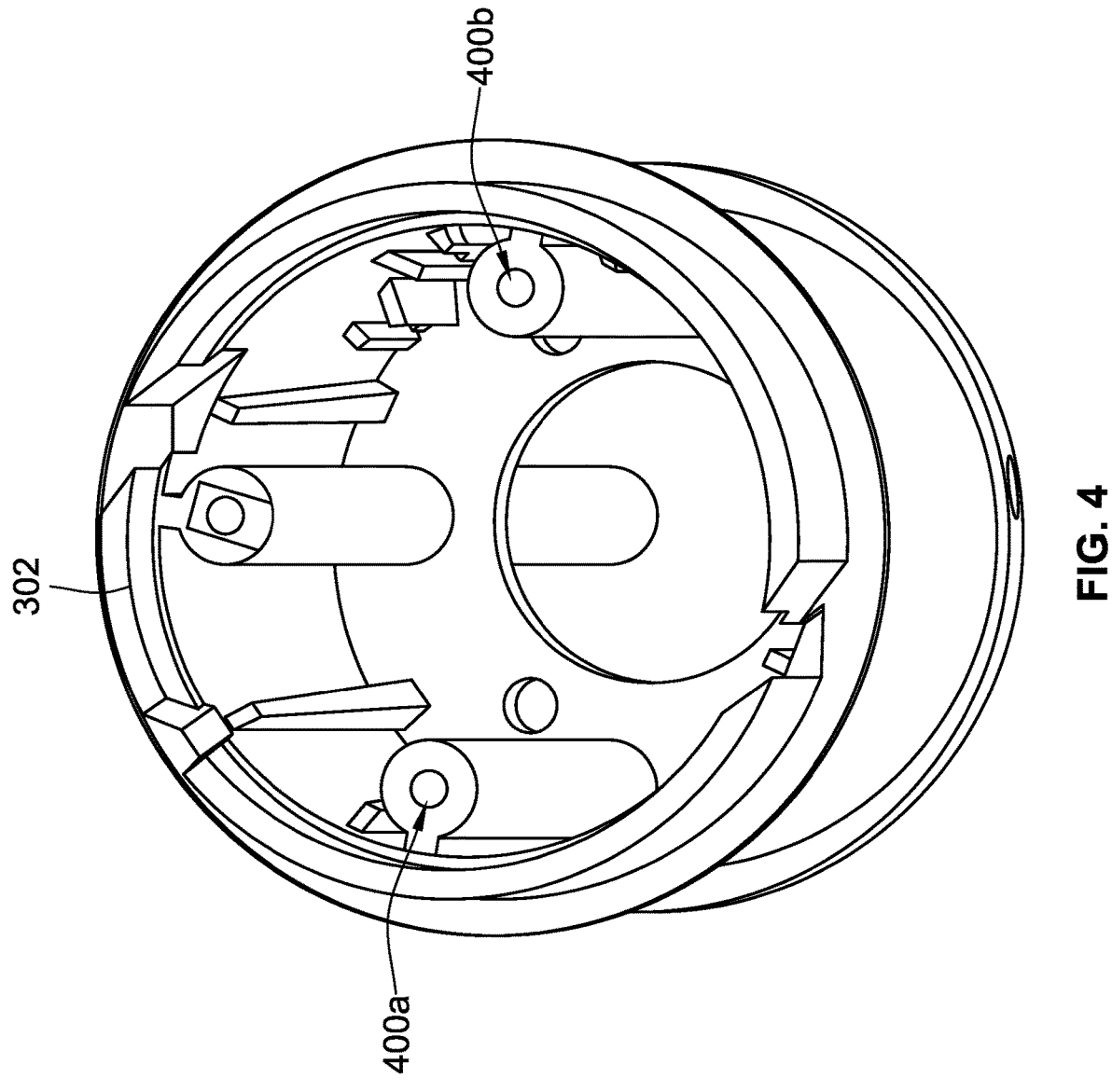
FIG. 4 is a perspective view of an example housing portion of the example vibration monitor of FIG. 2.

In the illustrated example, the first and second housing portions 300, 302 are coupled by threaded fasteners 314a, 314b (e.g., bolts, screws). The threaded fasteners 314a, 314b can be inserted through openings 316a, 316b, in the first end 304 of the first housing portion 300 and screwed into corresponding bores in the second housing portion 302. For example, FIG. 4 is a perspective view of the second housing portion 302. As shown in FIG. 4, the second housing portion 302 has two bosses 400a, 400b. The threaded fasteners 314a, 314b can be screwed into the bosses 400a, 400b to couple the first and second housing portions 300, 302.

Referring back to FIG. 3, the second housing portion 302 has a shoulder 318 and an extension 320 extending from the shoulder 318. The extension 320 forms the first end 308 of the second housing portion 302. When the vibration monitor 100 is assembled, the first and second housing portions 300, 302 are coupled such that at least a portion of the extension 320 extends into the second end 310 of the first housing portion 300. As such, the first and second housing portions 300, 302 partially overlap in the radial direction. In some examples, in addition to or as an alternative to the threaded fasteners 314a, 314b, the first and second housing portions 300, 302 may be coupled by a threaded connection or interface. For example, the outer surface of the extension 320 may be threaded (above the area where the light source 216 is located), and the inner surface of the second housing portion 302 near the second end 310 may be threaded. Therefore, the first and second housing portions 300, 302 can be coupled by screwing the two housing portions 300, 302 together.

As shown in FIG. 3, the vibration monitor 100 includes a circuit board 322a (e.g., a printed circuit board) coupled to and extending from the base plate 312. When the vibration monitor 100 is assembled, the circuit board 322a is disposed in the second housing portion 302. In some examples, multiple circuit boards are disposed in the second housing portion 302. The circuit board 322a includes circuitry 324. In some examples, the circuitry 324 includes programmable circuitry, such as a microprocessor, an ASIC, an FPGA, etc. The circuitry 324 may be configured to receive sensor signals, analyze the signals, and/or communicate the signals and/or data to a remote electronic device. As mentioned above, the vibration monitor 100 includes one or more sensors for detecting movement of the vibration monitor 100. For example, as shown in FIG. 3, the vibration monitor 100 includes a sensor 326. When the vibration monitor 100 is assembled, the sensor 326 is disposed in the housing 200 (e.g., in the second housing portion 302). The sensor 326 is in communication with the circuitry 324. The sensor 326 outputs signals based on movement or motion of the vibration monitor 100. In some examples, the sensor 326 is an accelerometer or gyroscope. In other examples, the sensor 326 can be implemented by another type of sensor. In this example, the sensor 326 is mounted on the circuit board 322a. In other examples, the sensor 326 can be coupled to another portion of the vibration monitor 100 (e.g., an inner surface of the housing 200). In some examples, the vibration monitor 100 may include multiple sensors such as two, three, four, etc. In some examples, the circuitry 324 is configured to analyze the signals from the sensor 326. For example, the circuitry 324 may receive the signals from the sensor 326, perform one or more processing steps on the signal, and analyze the signals to determine or identify a potential malfunction of the associated machine.

The circuitry 324 is also configured to activate the light source 216. In some examples, the circuitry 324 activates the light source 216 based on a status of the vibration monitor 100. The circuitry 324 may be configured to determine the status based on signals from the sensor 326 and/or other data inputs. In some examples, the circuitry 324 activates the light source 216 according to different color and/or blink patterns based on the status. For example, the light source 216 may be activated to display or illuminate a first color and/or blink pattern for a first status (e.g., when the vibration monitor 100 is pairing with another device), a second color and/or blink pattern for a second status (e.g., malfunction detected), and so forth.

In the illustrated example of FIG. 3, the light source 216 is implemented by a light pipe 328. The light pipe 328 is constructed of a translucent or partially translucent material. The example vibration monitor 100 also includes one or more light-emitting diodes (LEDs) to illuminate the light pipe 328. A first example LED 330a is labeled in FIG. 3. The first LED 330a is disposed in the housing 200. The first LED 330a is in communication with the circuitry 324. When the vibration monitor 100 is assembled, the first LED 330a is disposed adjacent a portion of the light pipe 328, as disclosed in further detail herein. Therefore, when the first LED 330 is activated, the light from the first LED 330a illuminates the light pipe 328, which emits the light outward (e.g., radially) to be seen by a person. In some examples, the first LED 330a can be controlled to activate to provide different colors and/or blink patterns.

In the illustrated example, the light pipe 328 is disc-shaped or ring-shaped. The light pipe 328 is disposed on the outer surface 218 of the housing 200. When the vibration monitor 100 is assembled, the light pipe 328 is coupled between the first and second housing portions 300, 302. In particular, when the vibration monitor 100 is assembled, the light pipe 328 extends circumferentially around the extension 320 of the second housing portion 302. Then, when the first and second housing portions 300, 302 are coupled together, the light pipe 328 is clamped between the first and second housing portions 300, 302. In particular, the light pipe 328 is clamped between the second end 306 of the first housing portion 300 and the shoulder 318 of the second housing portion 302.

Figure 5:
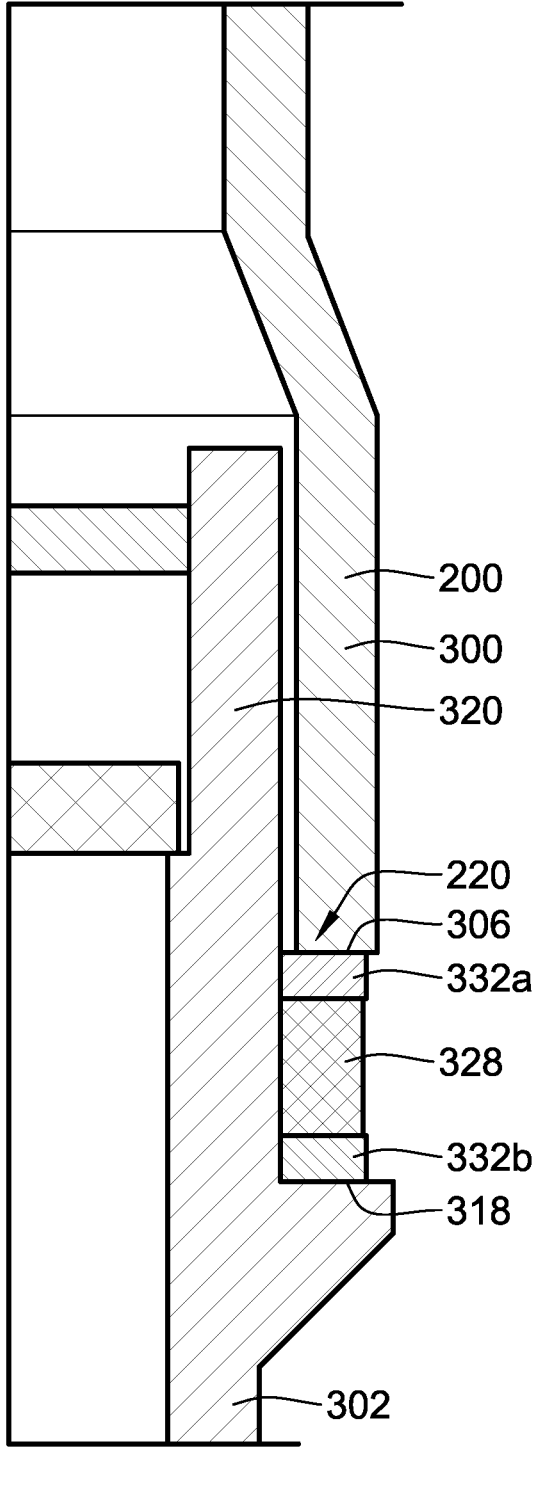
FIG. 5 is a cross-sectional view of a portion of the example vibration monitor of FIG. 2.

In some examples, the vibration monitor 100 includes one or more seals to limit or prevent water and other debris (e.g., dust, dirt, etc.) from leaking into the housing 200. For example, as shown in FIG. 3, the vibration monitor 100 includes a first seal 332a and a second seal 332b. The first and second seals 332a, 332b are circular seals. In some examples, the first and second seals 332a, 332b are thin gaskets. In other examples, the first and second seals 332a, 332b can be other types of seals, such as o-rings. The first and second seals 332a, 332b are disposed between the light pipe 328 and the first and second housing portions 300, 302. For example, FIG. 5 is a cross-sectional view showing a section of the first housing portion 300, the second housing portion 302, the light pipe 328, and the first and second seals 332a, 3332b. The area between the second end 306 of the first housing portion 300, the extension 320, and the shoulder 318 forms the groove 220. The light pipe 328 and the first and second seals 332a, 332b are disposed in the groove 220. The first seal 332a is disposed between the second end 306 of the first housing portion 300 and the light pipe 328, and the second seal 332b is disposed between the light pipe 328 and the shoulder 318 of the second housing portion 302. Therefore, when the first and second housing portions 300, 302 are coupled (e.g., via the threaded fasteners 314a, 314b, via threaded fasteners extending from the first housing portion 300 to the second housing portion 302), the seals 332a, 332b and the light pipe 328 are axially clamped between the first and second housing portions 300, 302. The seals 332a, 332b limit or prevent water and other debris from leaking past the light pipe 328 and into the housing 200.

Figure 6:
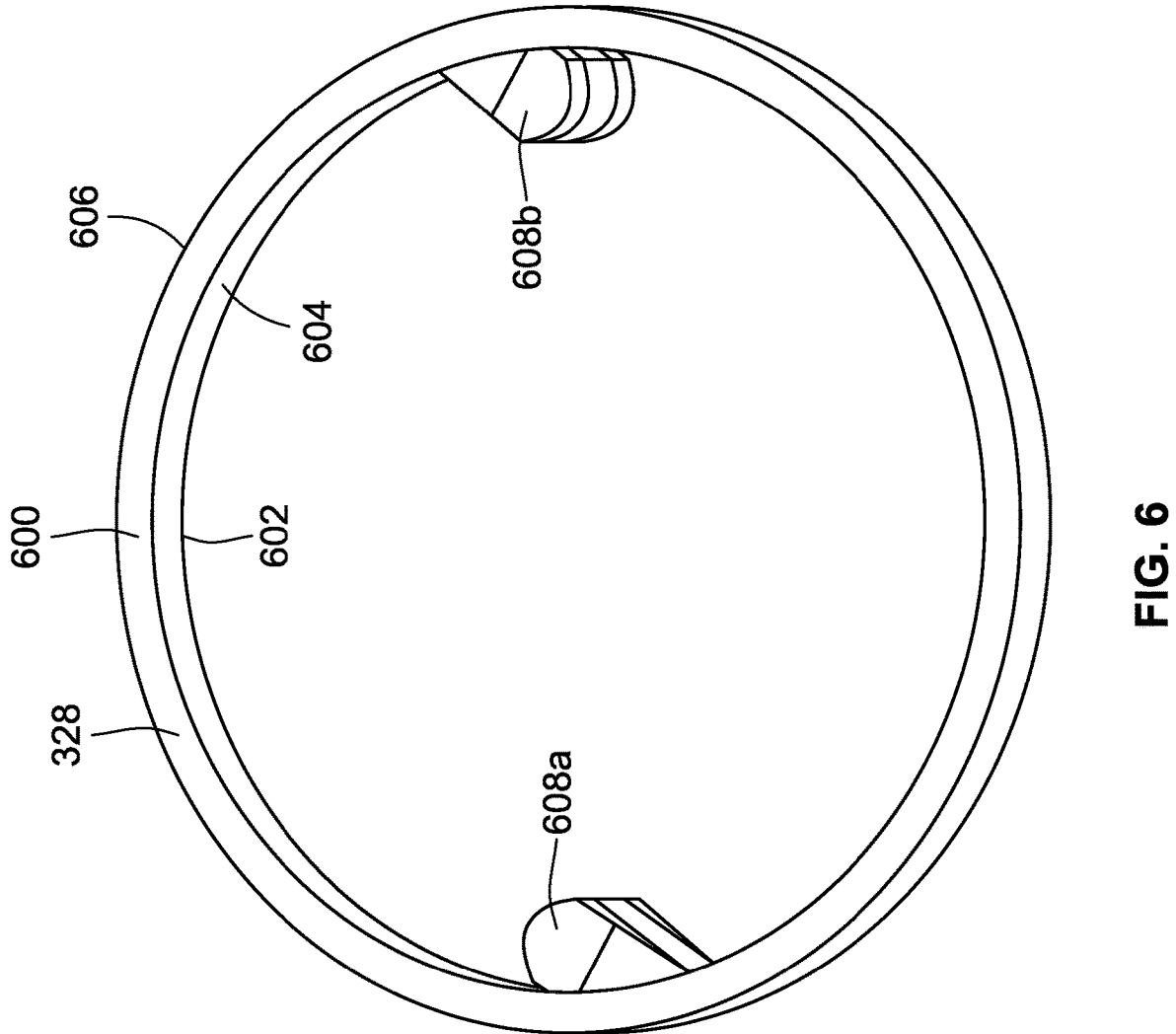
FIG. 6 is a perspective view of an example light pipe of the example vibration monitor of FIG. 2.

FIG. 6 is a perspective view of the light pipe 328. As disclosed above, the light pipe 328 is ring-shaped or disc-shaped. In this example, the light pipe 328 forms a continuous or complete circle. Therefore, when the vibration monitor 100 is assembled, the light pipe 328 extends completely around the housing 200. The light pipe 328 has a first face 600, a second face 602 opposite the first face 600, an inner peripheral surface 604, and an outer peripheral surface 606. As shown in FIG. 6, the light pipe 328 has a first protrusion 608a and a second protrusion 608b that extend radially inward from the inner peripheral surface 604. The first and second protrusions 608a, 608b form light inlets for the light pipe 328. The light pipe 328 is constructed of a translucent or partially translucent material. In some examples, the light pipe 328 is constructed of poly-methyl-methacrylate (PMMA), sometimes referred as acrylic, acrylic glass, and plexiglass. This type of material enables light to channel through and illuminate the light pipe 328. However, in other examples, the light pipe 328 can be constructed of other materials. In some examples, the light pipe 328 is constructed as a single unitary part or component (e.g., a monolithic structure). In other examples, the light pipe 328 is constructed as multiple parts that are coupled together.

Figure 7:
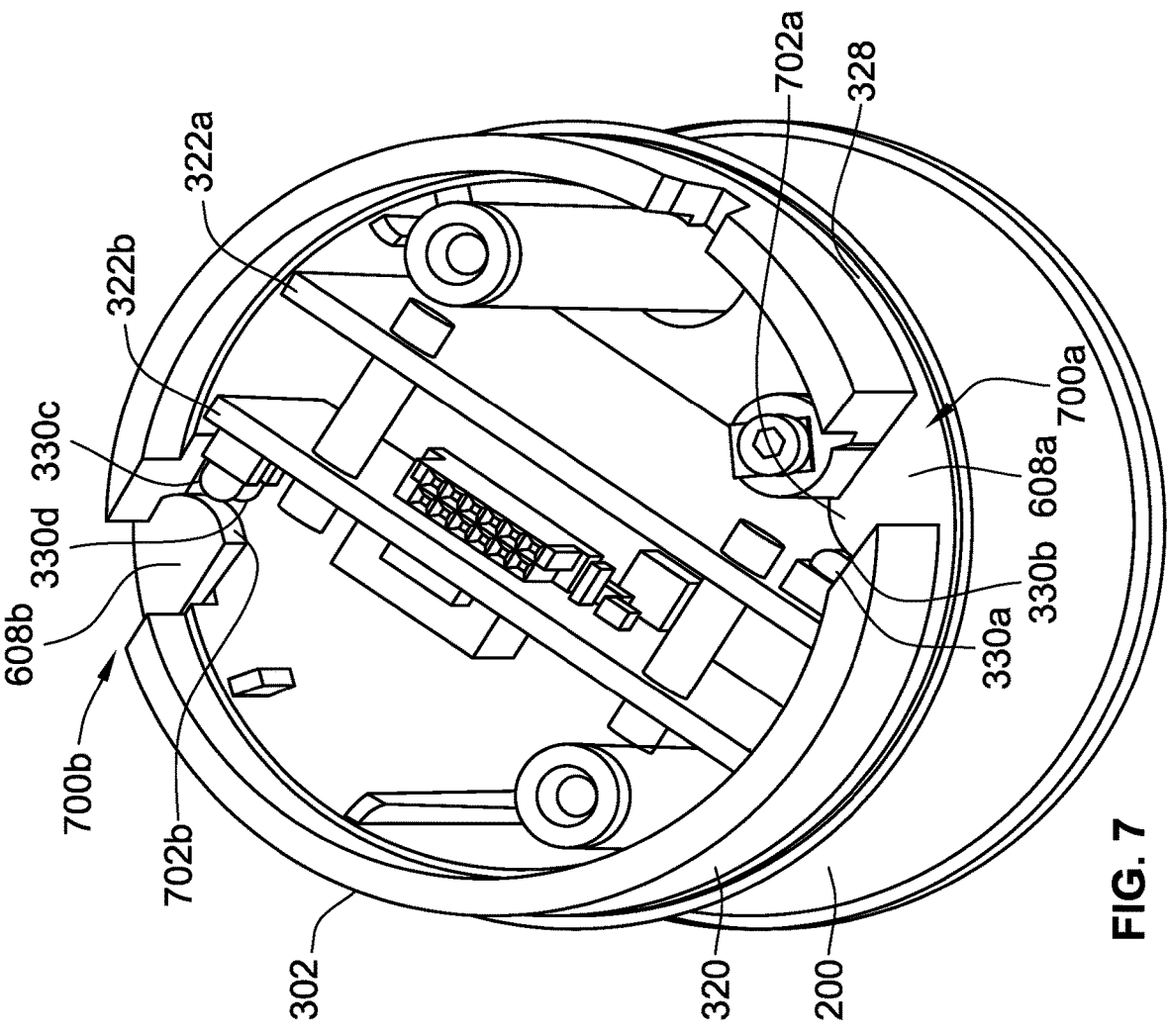
FIG. 7 is a perspective view of the example light pipe of FIG. 6 installed on the example housing portion of FIG. 4.
Figure 8:
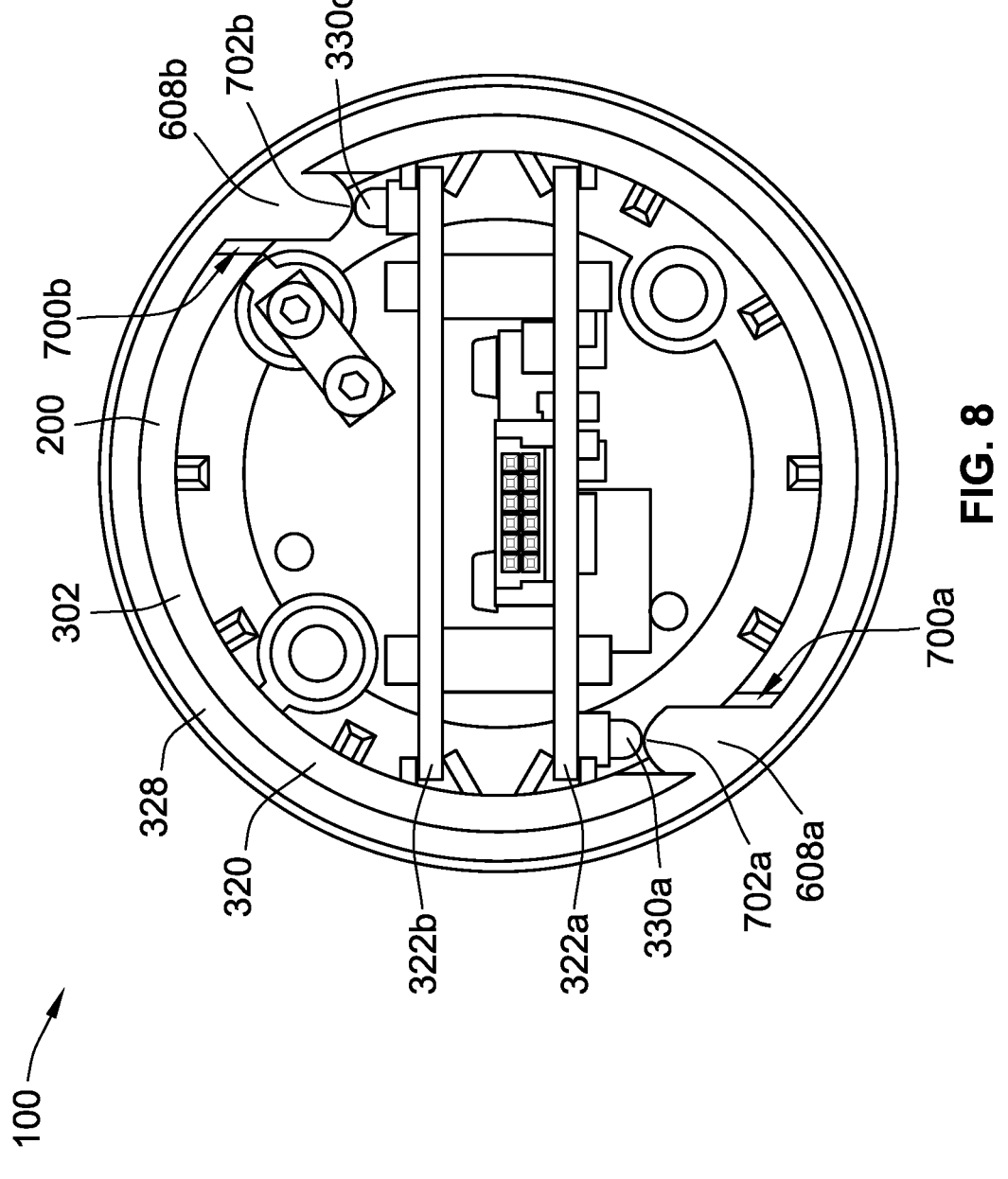
FIG. 8 is a top view of the example housing portion and the example light pipe of FIG. 7.

FIG. 7 is a perspective view showing the light pipe 328 installed on the second housing portion 302, and FIG. 8 is a top view showing the light pipe 328 installed on the second housing portion 302. As shown in FIGS. 7 and 8, the light pipe 328 is disposed around the extension 320 of the second housing portion 302. In the illustrated example, the second housing portion 302 has openings to receive the protrusions 608a, 608b of the light pipe 328. In particular, in this example, the extension 320 of the second housing portion 302 has a first opening 700a (e.g., a slot) and a second opening 700b. In this example, the first and second openings 700a, 700b are on opposite sides (e.g., spaced 180° apart) of the housing 200. The first protrusion 608a of the light pipe 328 extends through the first opening 700a, and the second protrusion 608b of the light pipe 328 extends through the second opening 700b. The light pipe 328 may be installed by sliding the light pipe 328 onto the extension 320 (e.g., in an axial direction) such that the first and second protrusions 608a, 608b are aligned with the first and second openings 700a, 700b.

In the illustrated example, the vibration monitor 100 includes a first set of LEDs for the first protrusion and a second set of LEDs for the second protrusion. For example, the vibration monitor 100 includes the first LED 330a and a second LED 330b for the first protrusion 608a, and a third LED 330c and a fourth LED 330d for the second protrusion 608b. All of the LEDs 330a-330d are disposed in the housing 200. The first and second LEDs 300a, 300b are disposed adjacent the first protrusion 608a of the light pipe 328, and the third and fourth LEDs 330c, 330d are disposed adjacent the second protrusion 608b of the light pipe 328. When one or more of the LEDs 330a-330d are activated, the light from the LED(s) 330a-330d is transmitted through the first and/or second protrusions 608a, 608b and illuminates the light pipe 328. This arrangement of having one or more LEDs on both sides of the light pipe 328 ensures the light pipe 328 is sufficiently illuminated on all sides. Further, having the LEDs 330a-330d within the housing 200 reduces sealing requirements for wires or electrical connectors that would otherwise be required if the LEDs were on the outside of the housing 200. Certain ones of the LEDs 330a-330d can be activated simultaneously to produce the same color and/or blink pattern according to the status of the vibration monitor 100. In some examples, the first LED 330a and the third LED 330c are the same color, such as red, and the second LED 330b and the fourth LED 330d are the same color, such as green, and are different than the first and third LEDs 330a, 330c. The first and third LEDs 330a, 330c can be activated simultaneously to illuminate the light pipe 328 red, while the second and fourth LEDs 330b, 330d can be activated simultaneously to illuminate the light pipe 328 green, or all of the LEDs 330a-330d can be activated simultaneously. The LEDs 330a-330d can also be activated to produce different flash or blink patterns (e.g., short continuous blinks, long continuous blinks, alternating short and long blinks, etc.). In other examples, one or more of the LEDs 330a-330d can be multi-color LEDs. For example, the first LED 330a may be a multi-color LED capable of being activated to create different colored light (e.g., red and green).

In the illustrated example, the vibration monitor 100 has two circuit boards 322a, 322b (e.g., parallel circuit boards). In the illustrated example, the first and second LEDs 330a, 330b are disposed on the first circuit board 322a and face a first direction toward a distal end 702a of the first protrusion 608a. The third and fourth LEDs 330c, 330d are disposed on the second circuit board 32b and face a second direction (opposite the first direction) toward a distal end 702b for the second protrusion 608b. In other examples, the LEDs 330a-330d can be disposed on opposite sides of the same circuit board and/or can be disposed on other structures in the vibration monitor 100, such as on an inner surface of the second housing portion 302, on a mount or bracket in the second housing 302, etc.

Figure 9:
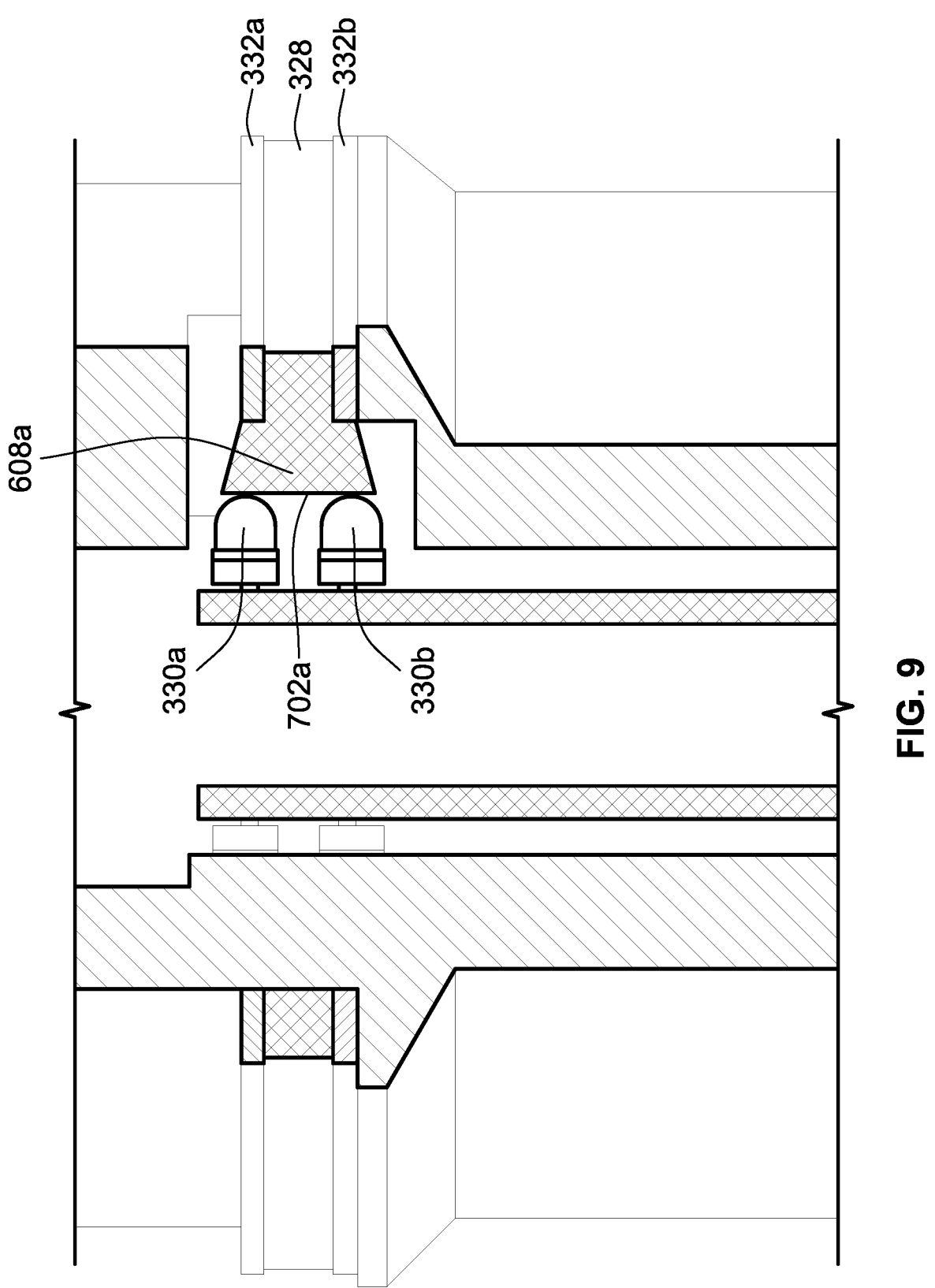
FIG. 9 is a partial cross-sectioned view of the example vibration monitor of FIG. 2.

FIG. 9 is a partial cross-sectional view of the vibration monitor 100 showing the first and second LEDs 330a, 330b in the housing 200. The first and second LEDs 330a, 330b are adjacent and aligned with the first protrusion 608a. As shown in FIG. 9, the first protrusion 608a has a tapered cross-section that enlarges toward the distal end 702a. This enlarged end ensures the first and second LEDs 330a, 330b can both be aligned (e.g., in the horizontal direction in FIG. 9) with the distal end 702a of the first protrusion 608a. The second protrusion 608b (FIGS. 6-8) has a similar shape.

While in the illustrated example there are two LEDs for each of the protrusions 608a, 608b, in other examples, the vibration monitor 100 may include only one LED for each protrusion 608a, 608b or more than two LEDs for each protrusion 608a, 608b (e.g., multiple LEDs of different colors). In some examples, the light pipe 328 may only have one protrusion (e.g., only the first protrusion 608a). The light from the first and second LEDs 330a, 330b may be intense enough to completely illuminate the light pipe 328. In other examples, the light pipe 328 may have more than two protrusions (e.g., three, four, five, etc.), each with one or more designated LEDs.

As shown in FIGS. 2-9, the light source 216 may be a continuous ring that displays light in all directions. However, in other examples, the light source 216 can be divided into two more portions or sections. In such examples, there may be gaps between the two or more portions or sections. Therefore, in some examples, the light source 216 may not be continuous.

While in the examples above the light source 216 is implemented as a light pipe that receives light from one or more LEDs in the housing 200, in other examples, the light source 216 can be implemented by other types of lights. For example, the light source 216 may be a strip or string of LEDs disposed in the groove 220. In other examples, the light source 216 can be another type of light, such as a halogen light, an incandescent light, or a fluorescent light. In such examples, one or more wires may extend through the side wall 206 to connect the light(s) to the circuitry in the housing 200.

While the example light source 216 is disclosed in connection with a vibration monitor for monitoring motion, the example light source 216 can also be implemented in other with other types of monitors or sensors. For example, the light source 216 can be implemented on a monitor with one or more temperature sensor(s), pressure sensor(s), etc. The light source 216 advantageously allows a user (e.g., a service operate) to easily see the status of the monitor device from different angles.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities, etc., the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities, etc., the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements, or actions may be implemented by, e.g., the same entity or object. Additionally, although individual features may be included in different examples or claims, these may possibly be combined, and the inclusion in different examples or claims does not imply that a combination of features is not feasible and/or advantageous.

From the foregoing, it will be appreciated that example systems, apparatus, articles of manufacture, and methods have been disclosed that improve a person's ability to determine a status of a vibration monitor. Examples disclosed herein provide an indicator light on a housing of a vibration monitor that can be easily seen from all directions around the vibration monitor. As such, the example vibration monitors do not need to be aligned in a particular orientation in order to see a status light.

Examples and example combinations disclosed herein include:

Example 1 is a vibration monitor comprising a housing, a sensor in the housing, a light source extending circumferentially around an outer surface of the housing, and circuitry to activate the light source based on a status of the vibration monitor.

Example 2 includes the vibration monitor of Example 1, wherein the light source is coaxial with the housing.

Example 3 includes the vibration monitor of Examples 1 or 2, wherein the light source is disposed in a groove formed in an outer surface of the housing.

Example 4 includes the vibration monitor of any of Examples 1-3, wherein the light source is a ring-shaped light pipe, the vibration monitor further including a light-emitting diode (LED) to illuminate the light pipe.

Example 5 includes the vibration monitor of Example 4, wherein the light pipe is constructed of poly-methyl-methacrylate (PMMA).

Example 6 includes the vibration monitor of Examples 4 or 5, wherein the light pipe has a first face, a second face opposite the first face, an inner peripheral surface, and an outer peripheral surface.

Example 7 includes the vibration monitor of Example 6, wherein the light pipe has a protrusion extending radially inward from the inner peripheral surface, the protrusion extending through an opening in the housing, the LED disposed in the housing adjacent the protrusion.

Example 8 includes the vibration monitor of Example 7, further including a circuit board in the housing, the LED disposed on the circuit board.

Example 9 includes the vibration monitor of Examples 7 or 8, wherein the LED is a first LED, further including a second LED disposed in the housing adjacent the protrusion, the second LED being a different color than the first LED.

Example 10 includes the vibration monitor of Example 9, wherein the protrusion has a tapered cross-section that enlarges toward a distal end of the protrusion.

Example 11 includes the vibration monitor of any of Examples 7-10, wherein the LED is a first LED, the protrusion is a first protrusion, and the opening is a first opening, wherein the light pipe includes a second protrusion extending radially inward from the inner peripheral surface, the second protrusion extending through a second opening in the housing, the vibration monitor further including a second LED disposed adjacent the second protrusion.

Example 12 includes the vibration monitor of Example 11, wherein the first and second openings are on opposite sides of the housing.

Example 13 includes the vibration monitor of any of Examples 4-12, wherein the housing includes a first housing portion and a second housing portion coupled to the first housing portion, and wherein the light pipe is clamped between the first and second housing portions.

Example 14 includes the vibration monitor of Example 13, wherein the second housing portion has a shoulder with an extension extending from the shoulder, the light pipe disposed around the extension, and wherein the light pipe is clamped between an end of the first housing portion and the shoulder of the second housing portion.

Example 15 includes the vibration monitor of Example 14, further including: a first seal between the light pipe and the end of the first housing portion; and a second seal between the light pipe and the shoulder of the second housing portion.

Example 16 is a vibration monitor comprising: a housing; a sensor in the housing; a light pipe on an outer surface of the housing, the light pipe having a protrusion extending through an opening in the housing; a light-emitting diode (LED) in the housing, the LED adjacent the protrusion; and circuitry to activate the LED to illuminate the light pipe.

Example 17 includes the vibration monitor of Example 16, wherein the light pipe is constructed of poly-methyl-methacrylate (PMMA).

Example 18 includes the vibration monitor of Examples 16 or 17, wherein the housing includes a first housing portion and a second housing portion, and when the light pipe is between the first housing portion and the second housing portion.

Example 19 includes the vibration monitor of Example 18, further including: a first seal between a first face of the light pipe and the first housing portion; and a second seal between a second face of the light pipe and the second housing portion.

Example 20 includes the vibration monitor of any of Examples 16-19, wherein the LED is a first LED, the vibration monitor including a second LED in the housing adjacent the protrusion, the second LED being a different color than the first LED.

The following claims are hereby incorporated into this Detailed Description by this reference. Although certain example systems, apparatus, articles of manufacture, and methods have been disclosed herein, the scope of coverage of this patent is not limited thereto. On the contrary, this patent covers all systems, apparatus, articles of manufacture, and methods fairly falling within the scope of the claims of this patent.

What is claimed is:

1. A vibration monitor comprising:
   a housing;
   a sensor in the housing;
   a light pipe extending circumferentially around an outer surface of the housing, the light pipe having a first face, a second face opposite the first face, an inner peripheral surface, and an outer peripheral surface, the light pipe having a protrusion extending radially inward from the inner peripheral surface, the protrusion extending through an opening in the housing;
   a light-emitting diode (LED) disposed in the housing adjacent the light pipe; and
   circuitry to activate the LED to illuminate the light pipe based on a status of the vibration monitor.

2. The vibration monitor of claim 1, wherein the light pipe is coaxial with the housing.

3. The vibration monitor of claim 1, wherein the light pipe is disposed in a groove formed in an outer surface of the housing.

4. The vibration monitor of claim 1, wherein the light pipe is constructed of poly-methyl-methacrylate (PMMA).

5. The vibration monitor of claim 1, further including a circuit board in the housing, the LED disposed on the circuit board.

6. The vibration monitor of claim 1, wherein the LED is a first LED, further including a second LED disposed in the housing adjacent the protrusion, the second LED being a different color than the first LED.

7. The vibration monitor of claim 6, wherein the protrusion has a tapered cross-section that enlarges toward a distal end of the protrusion.

8. The vibration monitor of claim 1, wherein the LED is a first LED, the protrusion is a first protrusion, and the opening is a first opening, wherein the light pipe includes a second protrusion extending radially inward from the inner peripheral surface, the second protrusion extending through a second opening in the housing, the vibration monitor further including a second LED disposed adjacent the second protrusion.

9. The vibration monitor of claim 8, wherein the first and second openings are on opposite sides of the housing.

10. The vibration monitor of claim 1, wherein the housing includes a first housing portion and a second housing portion coupled to the first housing portion, and wherein the light pipe is clamped between the first and second housing portions.

11. The vibration monitor of claim 10, wherein the second housing portion has a shoulder with an extension extending from the shoulder, the light pipe disposed around the extension, and wherein the light pipe is clamped between an end of the first housing portion and the shoulder of the second housing portion.

12. The vibration monitor of claim 11, further including:
a first seal between the light pipe and the end of the first housing portion; and
a second seal between the light pipe and the shoulder of the second housing portion.

13. A vibration monitor comprising:
a housing including a first housing portion and a second housing portion, the second housing portion having a shoulder with an extension extending from the shoulder;
a sensor in the housing;
a light pipe disposed around the extension of the second housing portion, the light pipe having a protrusion extending through an opening in the housing;
a first seal between a first face of the light pipe and an end of the first housing portion;

a second seal between a second face of the light pipe and the shoulder of the second housing portion, such that the light pipe, the first seal, and the second seal are clamped between the first housing portion and the second housing portion;
a light-emitting diode (LED) in the housing, the LED adjacent the protrusion; and
circuitry to activate the LED to illuminate the light pipe.

14. The vibration monitor of claim 13, wherein the light pipe is constructed of poly-methyl-methacrylate (PMMA).

15. The vibration monitor of claim 13, wherein the LED is a first LED, the vibration monitor including a second LED in the housing adjacent the protrusion, the second LED being a different color than the first LED.

16. The vibration monitor of claim 13, wherein the extension of the second housing portion extends into the first housing portion.

17. The vibration monitor of claim 13, wherein the opening is defined in the extension of the second housing portion.

18. The vibration monitor of claim 13, wherein the LED is a first LED, further including a second LED disposed in the housing adjacent the protrusion, the second LED being a different color than the first LED.

19. The vibration monitor of claim 18, further including a circuit board in the housing, wherein the first LED and the second LED are disposed on a same side of the circuit board.

20. The vibration monitor of claim 13, wherein the LED is a first LED, the protrusion is a first protrusion, and the opening is a first opening, wherein the light pipe includes a second protrusion extending through a second opening in the housing, the vibration monitor further including a second LED disposed in the housing and adjacent the second protrusion.

* * * * *